United States Patent Office 3,339,230
Patented Sept. 5, 1967

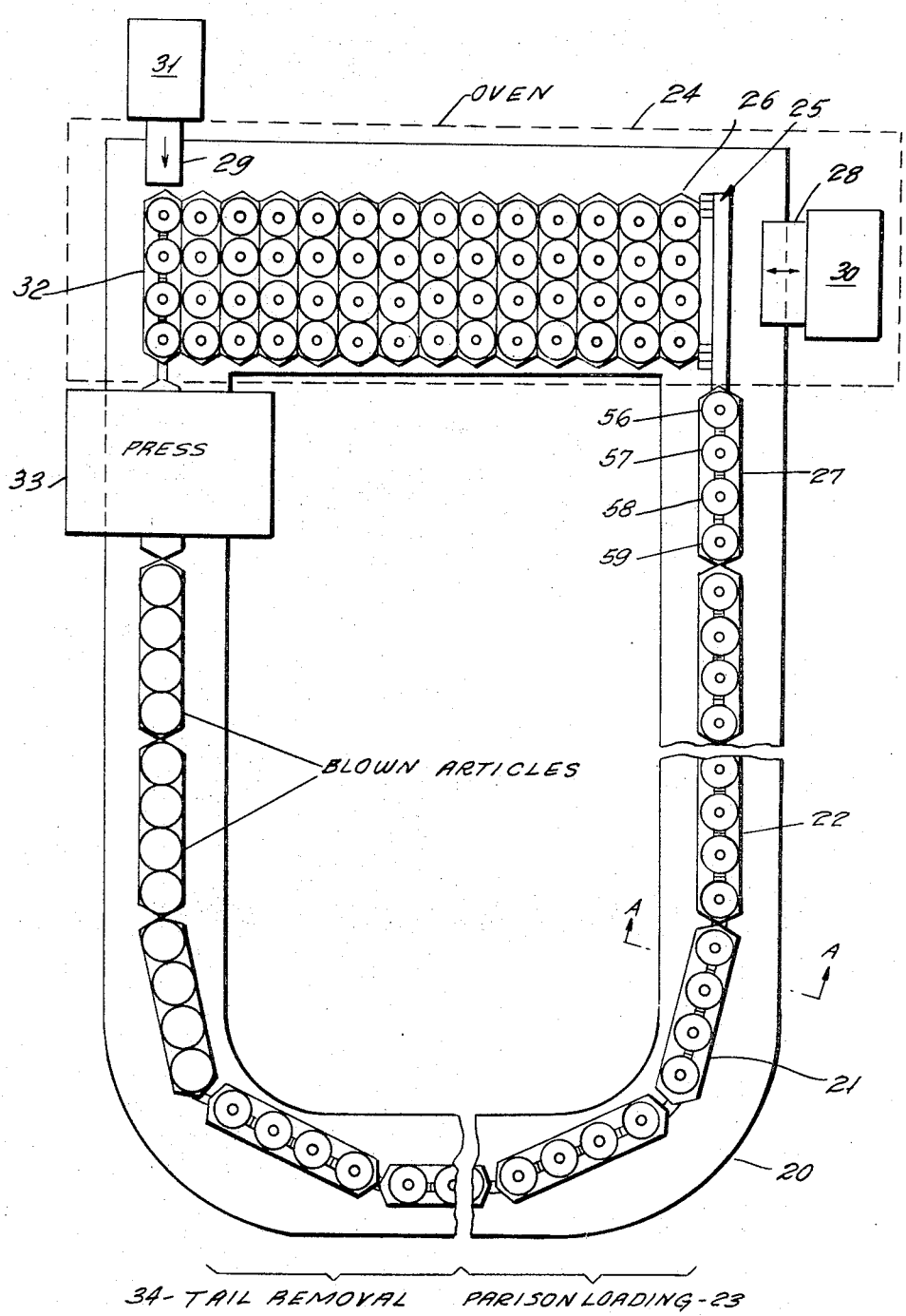

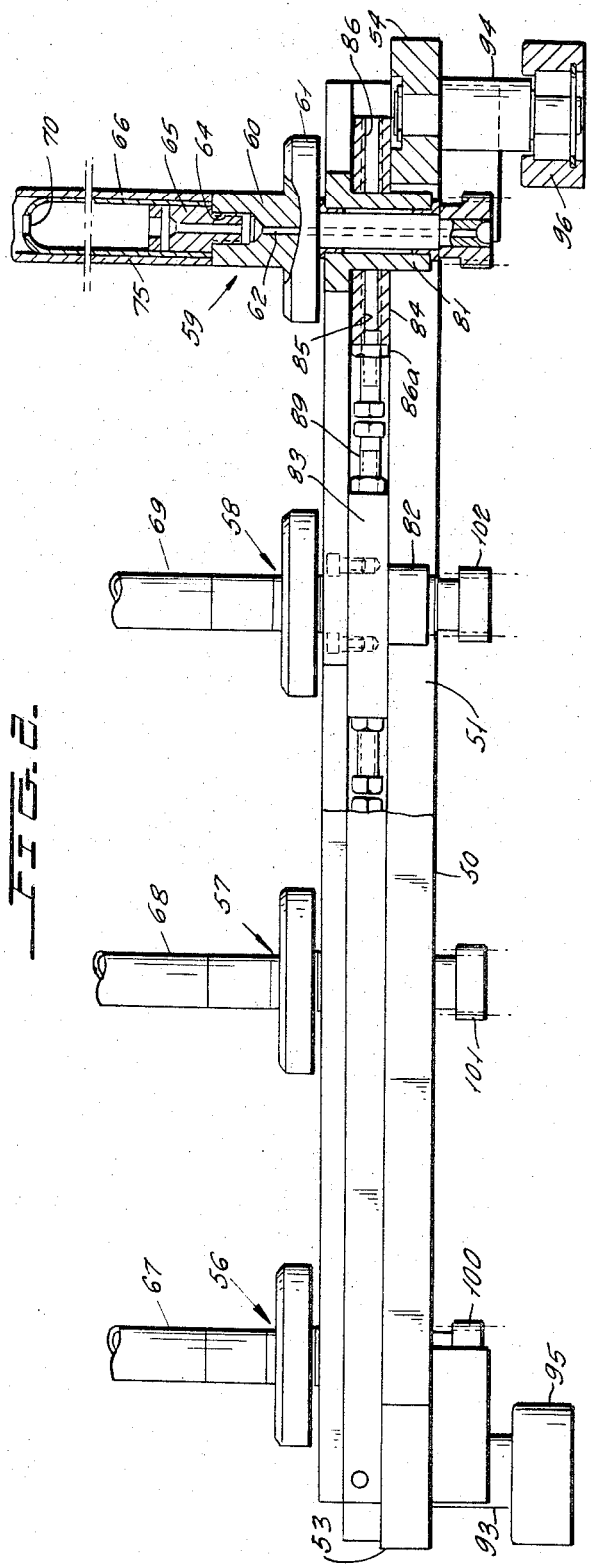
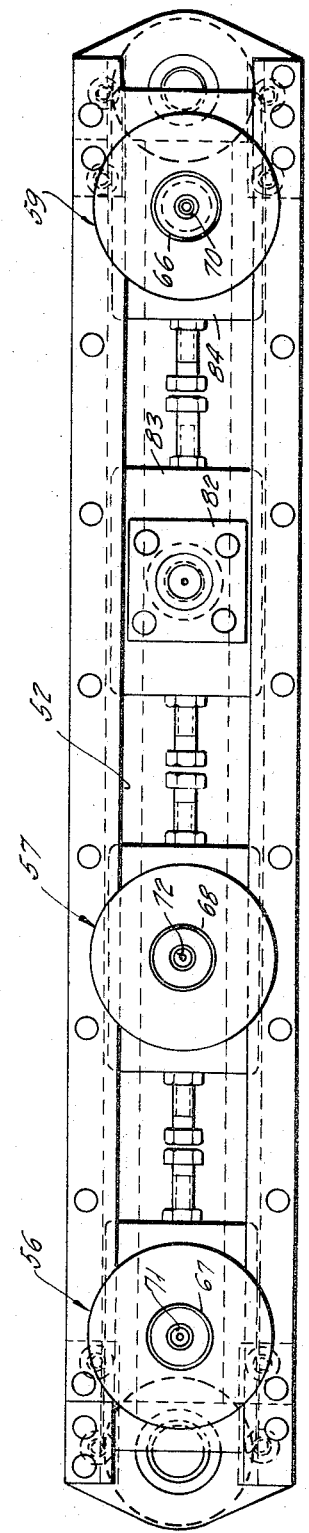

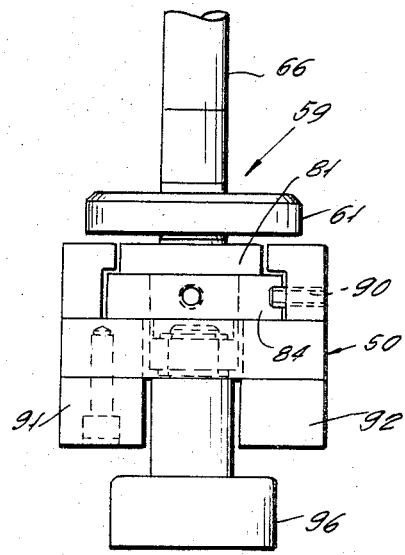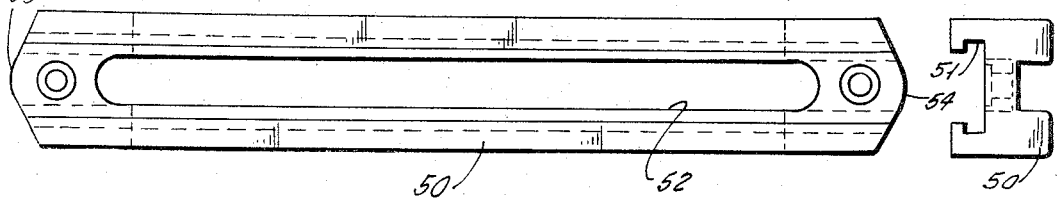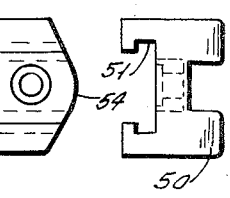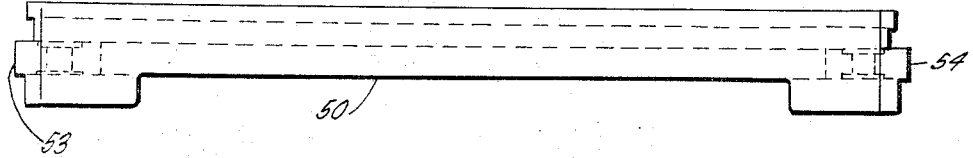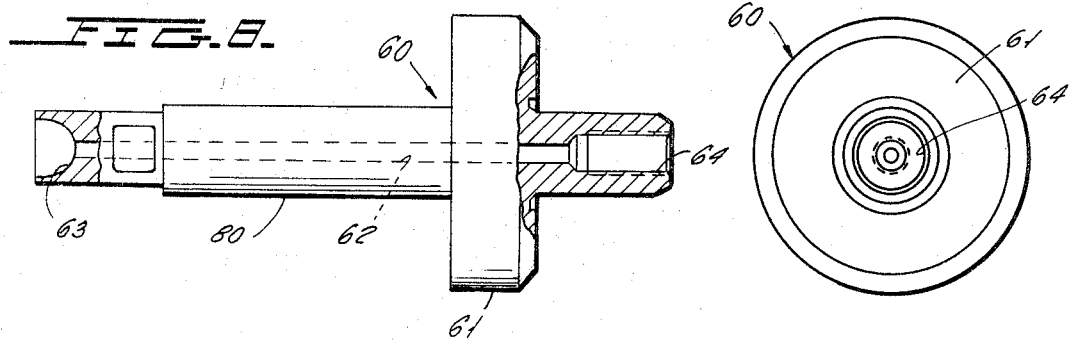

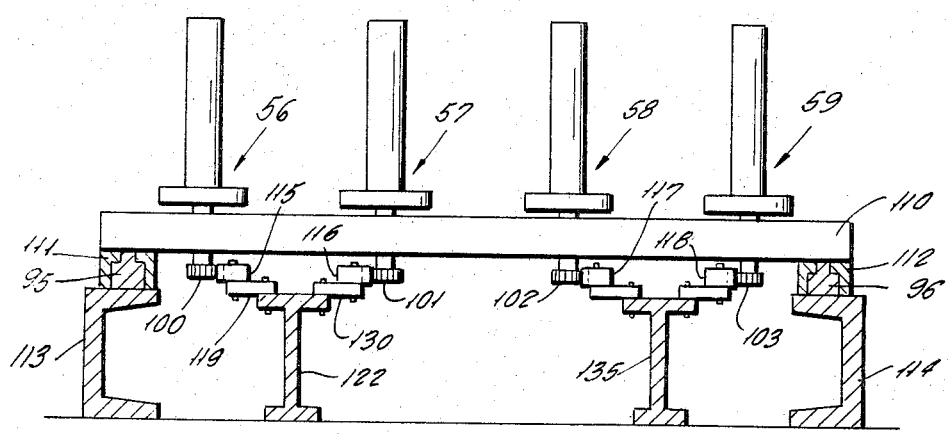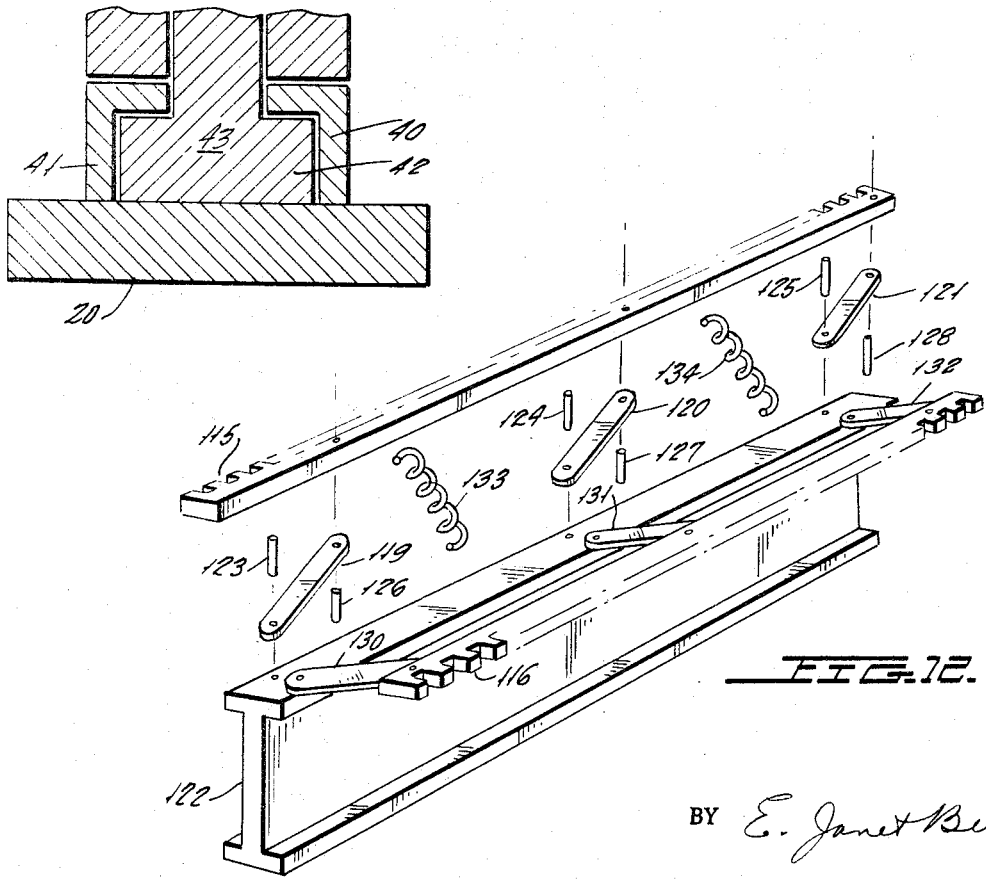

3,339,230
MOLDING APPARATUS
John J. Farrell, 40 Abby Lane,
Greenbrook, N.J. 08812
Filed Jan. 22, 1965, Ser. No. 427,397
6 Claims. (Cl. 18—5)

ABSTRACT OF THE DISCLOSURE

A blow molding apparatus having an oven, conveyor, independently driven racks supporting a plurality of parison supports, the racks having a gear system which is rotated by an engaging mechanism in the oven to rotate the parison supports.

---

This invention relates to a novel blow molding apparatus, and more particularly relates to a novel blow molding apparatus wherein a plurality of parisons are carried in a common rack which is cycled through the blow molding apparatus.

Blow molding devices are well-known to those skilled in the art, and commonly include a parison support means which receives a thermoplastic tube. The parison may be a pre-extruded tube of suitable composition which is first passed into an oven and heated to its softening temperature. The parison is thereafter passed to a suitable press which closes off one end of the thermoplastic tube within a suitable mold and injects air into the opposite end of the tube, thus blowing the tube to fill the mold cavity. Thereafter, the parison support and the blown object are moved out of the press to a cooling stage and removal stage.

In the prior art, this operation is a continuous operation wherein a circular-type conveyor means conveys the parison support means to its various operation stages of parison loading, parison heating, pressing, cooling and removal. This continuous conveyor means has been formed of a channel in which the parison support means are loaded individually from a suitable loading position. The complete conveyor chain is completely filled with parison support means, whereupon the movement of loading of one parison support in the conveyor chain will cause the complete chain to advance by a distance equivalent to the space occupied by the single parison support.

The principle of the present invention is to provide a novel blow molding apparatus of the above noted general type where, however, the parison support means are loaded into subassemblies of a plurality of parison support means which subassemblies are then injected into the conveyor system. Thus, the invention avoids the need for the handling of individual parison supports, and permits the handling of large sub-groups of supports, thereby substantially simplifying the apparatus and increasing the speed of operation of the apparatus.

Accordingly, a primary object of this invention is to provide a novel blow molding apparatus.

Yet another object of this invention is to provide a novel blow molding apparatus which reduces the handling time of individual parison supports.

A further object of this invention is to provide a novel blow molding apparatus wherein individual parison supports are handled in sub-groups by virtue of their being contained in common conveyor support means.

Yet a further object of this invention is to simplify the construction of blow molding apparatus.

These and other objects of this invention will become apparent from the following description when taken in connection with the drawings, in which:

FIGURE 1 is a schematic plan view of a blow molding apparatus constructed in accordance with the invention, and illustrates all of the stages traversed by sub-groups of parison supports carried in a common rack.

FIGURE 2 is a side view partially in cross-section of one of the mounting racks which carries a plurality of parison supports in accordance with the invention.

FIGURE 3 is a top view of FIGURE 2.

FIGURE 4 is a side view of FIGURE 2.

FIGURE 5 is a top view of the slide fixture body of the rack of FIGURES 2, 3 and 4.

FIGURE 6 is a front view of FIGURE 5.

FIGURE 7 is a side view of FIGURE 5.

FIGURE 8 is a side view partially in cross-section of the parison tube shaft for the various parison supports of FIGURES 2, 3 and 4.

FIGURE 9 is a top view of FIGURE 8.

FIGURE 10 is a cross-sectional view schematically illustrating the manner in which the rack roller of FIGURES 2, 3 and 4 is captured in the rack transport table of FIGURE 1.

FIGURE 11 illustrates the manner in which the individual racks are transported through the oven of FIGURE 1.

FIGURE 12 is a partially exploded perspective view illustrating the pivotally mounted rack means of FIGURE 11 for rotating the parisons in the oven of FIGURE 1.

Referring first to FIGURE 1, there is illustrated therein a typical blow molding apparatus constructed in accordance with the invention which includes a rack transport table 20 which has slidably contained therein a plurality of racks such as racks 21 and 22 which circulate around the system. The racks 21 and 22 are shown in detail in FIGURES 2 through 9, and will be described in detail hereinafter.

Each of the racks abut one another at their ends so that motion of one rack is transmitted to the other rack in FIGURE 1. In following the motion of the rack of parisons 21 and 22 in FIGURE 1, it will be observed that the racks move in a counterclockwise direction so that they move from a loading stage 23, at which stage a plurality of parison tubes of a suitable thermoplastic material are loaded onto the individual parison supports carried in the racks. This will be described more fully hereinafter where, for purposes of illustrating the invention, each of the racks will be seen to carry four parison support means which receive respective thermoplastic tubes. Clearly, however, any desired number of parison support means could be subassembled on a single rack.

As the individual racks circulate in a counterclockwise direction, they pass into oven 24 where they are subjected to a suitable softening temperature for a suitable length of time determined by the cycling of the machine. It will be observed that the right-hand portion of the oven 24 has an open space 25 immediately adjacent the first rack 26 in the oven. Thus, when the machine is suitably cycled, the rack 27 immediately adjacent the oven can be moved into this open space 25. Once a new rack such as rack 27 enters the oven, a suitable electrical control means is actuated, thereby to actuate a suitable piston such as piston 28 after the actuation of a piston 29 by their operating cylinders 30 and 31, respectively, whereupon the rack just loaded into oven 24 receives piston 28, thereby to push the entire group of racks loaded into oven 24 to the left. Note that immediately preceding this operation, the piston 29 is operated thereby ejecting the rack 32 from the oven and toward the pressing stage of press 33. Thus, the rack 32, for example, has been in the oven for a sufficient length of time so that its parisons are in a suitable condition for pressing in the press 33.

In the next cycle, and with advancement of the conveyor by a further rack length, the rack from press 33 is ejected therefrom with the blown articles connected to their parison support means. These racks containing blown articles are then permitted to continue to advance until they are suitably cooled, and move into a suitable tail-removal stage 34, and thence back into the parison loading stage for the new loading of parisons.

It will be observed that as the various racks move through the oven 24, they move therethrough with parallel arranged parisons. This is to be contrasted to prior art arrangements wherein individual parison support members move around the conveyor system and pass through the oven in a single line. Therefore, in the past the oven could not be loaded with as many parisons as in the present invention, wherein the parison racks move through the oven in a direction transverse to their length.

Accordingly, the invention permits higher speed operation of the overall system since more efficient heating is obtained of a larger number of parison subassemblies with a simple operating mechanism.

As pointed out above, any number of parison subassemblies can be carried in a single rack. Moreover, while FIGURE 1 illustrates only a single rack moving transversely in oven 24, it will be apparent to those skilled in the art that two or more racks can be moved into press 33 by cylinder 29 and thereafter loaded into open space 25 so that two or more racks will move through the oven abreast of one another. Thus, the oven capacity can be increased in any desired manner consistent with the capacity of press 33. That is to say, the press 33 can now be increased in size or increased in speed of operation with the supply of heated parisons being virtually limitless in view of their parallel stacking in oven 24. Note that in the prior art the parison support structures moved in a single line through oven 24 by virtue of their single or individual loading in the conveyor system.

For purposes of illustration, and not by way of limitation, the remaining figures and description illustrate a typical apparatus for implementing the novel concepts contained in FIGURE 1.

Thus, in FIGURE 10, there is illustrated in cross-sectional view the conveyor table 20. The conveyor table 20 has a pair of upstanding L-shaped channels 40 and 41 which capture a suitable bearing 42 extending from shaft 43 wherein ench of the racks will have such a shaft 43 in bearing 42 extending from either end thereof. Thus, the racks are guided around continuous channels 40 and 41 which extend from press 33 to the input of oven 24. As pointed out previously, the racks abut one another so that the motion of the rack ejected by cylinder 29 will cause all of the racks to move through at least one rack position with the last rack entering open space 25 formed by piston 28.

As a further feature of the invention, and in order to insure equal heating of the parisons, the parison support assemblies are rotated while they are within the oven 24 by a suitable rotating means illustrated in FIGURES 11 and 12, which will be described more fully hereinafter.

FIGURES 2 through 7 specifically show a typical rack construction in accordance with the invention which permits the mounting of a plurality of parison support means which are further shown in FIGURES 8 and 9.

Referring now to FIGURES 2 through 9, the common rack is comprised of a slide fixture 50, best shown in FIGURES 5, 6 and 7, which has a T-shaped channel 51 (FIGURE 6) which communicates with an elongated slot 52. The ends of slide fixture 50 are rounded, as shown by ends 53 and 54, thus defining a slidable bumper for engaging the end of an adjacent rack, thereby permitting one rack to push the other without jamming.

The individual parison support means loaded into the slide fixture 50 are best shown in FIGURES 2, 3 and 4 as comprising parison support assemblies 56, 57, 58 and 59 wherein support 59 is shown partially in cross-section in FIGURE 2. Each of the parison support assemblies are identical in construction, and are comprised of a main tube shaft shown as main tube shaft 60 for parison support 59 in FIGURES 2, 8 and 9. The tube shaft 60 is provided with an extending flange 61 and a central opening for air channel 62 which communicates from an air injector input nozzle 63 to its upper end 64 of channel 62. The upper end of channel 64 then receives a suitable adapter plug 65, as shown in FIGURE 2, which has a suitable continuous opening therethrough upon which is placed a parison tube support 66.

The parison tube support similar to support 66 is also shown for assemblies 56, 57 and 58 as tubes 67, 68 and 69, respectively. Each of the tubes 66 through 69 then has an opening in the end thereof such as openings 70, 71 and 72, shown for tubes 66, 67 and 68, respectively, in FIGURES 2 and 3.

It is to be noted that these shafts 66 through 69 are the shafts which receive the preformed thermoplastic tube which is to be extruded. Thus, a tube similar to tube 75 of FIGURE 2 is placed over member 66 in the parison loading stage 23 of FIGURE 1. Clearly, once these parisons such as parison 75 are suitably heated and move into the pressing stage, the press will initially nip the upper end of tube 75 over the top of member 66 to define an air seal, whereupon the application of air to the air injection input 63 will cause the heated tube 75 to expand within the mold in the pressing stage 33 of FIGURE 1. This is old and well known to those skilled in the blow molding art.

Returning to the construction of the parison support 59 in FIGURE 2, it will be observed that the lower extending shaft portion 80 suitably receives a collar 81. A similar collar 82 is shown in FIGURE 2 for parison support assembly 58. The collar 81 extends into slot 51 which laterally fixes the location of the parison subassembly with respect to the slide fixture 50.

Note that the collar 82 has a square head, as shown best in FIGURE 3, which receives a plurality of screw means which connect the collar such as collar 82 to a slide such as slide 83 which is received in the T-shaped slot 51 of the slide fixture 50. A similar square-shaped pad such as pad 84 is provided for the parison support 59 as well as all of the other parison supports.

The slide such as slides 83 and 84 then have tapped openings therein such as tapped openings 85 and 86 in slide 84 which threadably receive suitable spacing bolts such as the spacing bolt 87 which is threaded into opening 85 and secured therein by the lock-nut 86a. The slide 83 then has similar spacer bolts 88 and 89 therein, wherein bolt 89 abuts bolt 87, thereby to adjustably space parison supports 58 and 59.

It will now be apparent that the individual parison supports are loaded into the slide rack 50, and are suitably adjustably spaced from one another by the extending spacer bolts such as spacer bolts 87 and 89. Thereafter, the parison supports are fixed in the slide assemblies by any suitable locking means such as set-screws which could pass through openings such as opening 90, illustrated in FIGURE 4, which is aligned with a suitable tapped opening in the slide 84.

After the parison supports are loaded into the slide assembly, suitable end blocks such as blocks 91 and 92 can be secured to the opposite corners of the slide fixture and a guide roller means is connected to either end of the slide fixture.

Thus, as best shown in FIGURES 2, 3 and 4, two shafts 93 and 94 are secured to suitable openings at the opposite ends of the slide fixture 50, and receive rollers 95 and 96, respectively. The rollers 95 and 96 are equivalent to the roller 42, illustrated in FIGURE 10, and comprise the means for guiding the various racks in the conveyor assembly of FIGURE 1.

Note that the racks are loaded externally of the blow molding apparatus so that any desired parison support size can be loaded into a common rack structure. Moreover, the parison supports are easily spaced from one another in order to accommodate the various diameters to which their parisons are to be blown.

Returning now to FIGURES 1, 11 and 12, it will be understood that each of the racks illustrated in FIGURE 1 may be identical in construction to that described in FIGURES 2 through 9. Thus, for example, the rack 27 of FIGURE 1 has the four parison support elements 56, 57, 58 and 59 thereon for receiving four parisons. Each of the remaining racks are constructed in an identical manner. Note, however, that the use of four parison supports in a common rack has been selected for illustrative purposes only and that any number of individual parison supports can be subassembled into a common rack.

As previously indicated, as the individual racks are transversely moved within oven 24, it is desirable, in accordance with the invention, to obtain some rotation of the parisons to insure equally distributed heating thereof.

To this end, the parison supports of FIGURES 2, 3 and 4 are rotatably mounted within their bushing such as busings 81 and 82 and are terminated by gears such as gears 100, 101, 102 and 103 at the end of the shaft such as shaft 80 for the supports 56 through 59, respectively.

FIGURES 11 and 12 illustrate the manner in which a novel gear rack structure engages these extending gears in order to rotate the parison supports and thus the parisons within the oven when the parison support rack is transversely moved.

More particularly, FIGURE 11 illustrates the parison supports 56 through 59 of a rack 110 which is identical to the rack of FIGURES 2, 3 and 4 wherein the parison supports have the extending gears 100, 101, 102 and 103, respectively. When the rack 110 moves within oven 24, it is picked up by a pair of channels such as channels 111 and 112 which communicate with channels similar to channels 40–41 of FIGURE 10 wherein the guide rollers 95 and 96 of FIGURE 2 ride in channels 111 and 112, respectively. The channels 111 and 112 are then carried on U-shaped channels 113 and 114 which are connected to a suitable support base.

In accordance with a further aspect of the invention, a novel elongated gear rack is then provided for each line of parisons in the adjacent transversely moving racks. Thus, in FIGURE 11, elongate gear racks 115, 116, 117 and 118 extend perpendicular to the support rack 110 and engage gears 100 through 103, respectively, of the rack 110 along with the similarly located gears of all the racks adjacent to rack 110 within oven 24.

The gear racks 115 and 116 are further shown in FIGURE 12 where it is seen that these gear racks are carried by a plurality of rotating links such as the links 119, 120 and 121 which are pivotally connected to a support I-beam 122 by pivot pins 123, 124 and 125, respectively. The opposite end of links 119, 120 and 121 are then pivotally connected to rack 115 by pivot pins 126, 127 and 128, respectively. The rack 116 of FIGURE 12 is then illustrated in its assembled position and is mounted to the I-beam 122 by the pivot links 130, 131 and 132, respectively.

A suitable biasing means is then provided for each of racks 115 and 116 shown as biasing springs 133 and 134 which are positioned between the rearward edge of I-beam 122 and the inner edge of gear rack 115 for the purpose of biasing the gear rack 115 outwardly. A similar biasing means is provided for gear rack 116. Note that the gear racks 117 and 118 are provided with a structure identical to that shown in FIGURE 2 for biasing the racks outwardly and pivotally supporting the racks on the I-beam 135.

The novel structure of FIGURES 11 and 12 will serve to bias the teeth of gear racks 115 through 118 toward engagement with the gears 100 to 103, respectively. Thus, as the support rack 110 moves transversely to its axis, the gears 100 through 103 must rotate on their respective racks 115 through 118, respectively, thereby rotating the parison supports 56 through 59, respectively, and thus the parisons carried on these parison supports. This will then insure equal heating of the parisons carried in the oven 24.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

I claim:

1. A blow molding apparatus comprising in combination, an oven, a press, a parison removal stage, a parison conveyor system, a plurality of elongated parison support racks; said parison support rack being connected to said parison conveyor system; said parison conveyor system passing through said oven, said press, said parison loading stage, and said parison removal stage; said plurality of parison support racks being connected to said parison conveyor system; and conveyor drive means connected to said racks for driving said racks along said parison conveyor system; each of said parison support racks comprising elongated members; a plurality of individual parison support means connected to each of said individual racks and lying on a straight line; each of said plurality of individual parison support means having single parison securing means for securing a single respective parison; each of said plurality of each of said parison support means on a respective parison support rack moving as a unitary subassembly along said conveyor system.

2. The apparatus substantially as set forth in claim 1 wherein each of said racks are in end to end abutment relation in said conveyor system.

3. The device substantially as set forth in claim 1 wherein said racks move through said oven on said conveyor system in a direction transverse to their direction of elongation.

4. The device substantially as set forth in claim 1 wherein each of said parison support means are rotatably secured to their said respective parison support racks; each of said parison support means having an extending engaging surface, said oven including gear rack means for engaging each of said extending engaging surfaces of each of said parison support means; whereby said parison support means is rotated as said parison support racks move through said oven.

5. The device substantially as set forth in claim 1 wherein said oven includes an input end and an output end; said conveyor system including an elongated track extending from said output end of said oven to the said input end of said oven; each of said elongated parison support rack having first and second spaced track engaging means extending therefrom and engaging said elongated track.

6. The device substantially as set forth in claim 5 wherein said conveyor system includes a second and third parallel elongated track means extending through said oven; said first and second spaced track engaging means of each of said parison support racks engaging said second and third tracks respectively whereby said parison support racks move through said oven in a direction at an angle to a line connecting said first and second track engaging means.

References Cited
UNITED STATES PATENTS 3,149,373   9/1964   Marzillir _____ 18—5

J. SPENCER OVERHOLSER, *Primary Examiner.*

WILBUR L. McBAY, *Examiner.*